(12) United States Patent
Attar

(10) Patent No.: US 8,908,585 B2
(45) Date of Patent: Dec. 9, 2014

(54) METHODS AND DEVICES FOR MITIGATING POWER CONSUMPTION IN SLOTTED MODE COMMUNICATION PROTOCOLS

(71) Applicant: QUALCOMM Incorporated, San Diego, CA (US)

(72) Inventor: Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 13/739,711

(22) Filed: Jan. 11, 2013

(65) Prior Publication Data

US 2013/0329616 A1    Dec. 12, 2013

Related U.S. Application Data

(60) Provisional application No. 61/658,373, filed on Jun. 11, 2012.

(51) Int. Cl.
*G08C 17/00* (2006.01)
*H04W 52/02* (2009.01)

(52) U.S. Cl.
CPC ...... *H04W 52/0206* (2013.01); *H04W 52/0245* (2013.01); *H04W 52/0229* (2013.01)
USPC .......................................................... 370/311

(58) Field of Classification Search
USPC .......................... 370/310–311, 328–339, 441; 375/136–137, 140, 152, 317; 455/343.1, 343.2
See application file for complete search history.

(56) References Cited

U.S. PATENT DOCUMENTS

| | | | |
|---|---|---|---|
| 6,101,173 A | 8/2000 | Bayley | |
| 6,363,260 B1 * | 3/2002 | Achour et al. | 455/553.1 |
| 7,133,702 B2 * | 11/2006 | Amerga et al. | 455/574 |
| 7,142,896 B2 * | 11/2006 | Lee | 455/574 |
| 7,423,994 B2 | 9/2008 | Liu et al. | |
| 7,978,664 B2 | 7/2011 | Kim | |
| 8,346,313 B2 | 1/2013 | Tu | |
| 2004/0176147 A1 | 9/2004 | Escalante | |
| 2007/0178875 A1 | 8/2007 | Rao et al. | |
| 2011/0294456 A1 | 12/2011 | Anderson et al. | |

FOREIGN PATENT DOCUMENTS

WO    WO-0033594 A1    6/2000

OTHER PUBLICATIONS

International Search Report and Written Opinion—PCT/US2013/044780—ISA/EPO—Sep. 3, 2013.
Chapter II Demand and Article 34 Amendments with Response to Written Opinion, Jan. 15, 2014 (PCT/US2013/044780).
Notification of Transmittal of the International Preliminary Report on Patentability, Jul. 7, 2014 (PCT/US2013/044780).

* cited by examiner

*Primary Examiner* — Frank Duong
(74) *Attorney, Agent, or Firm* — QUALCOMM IP Department; James Hunt Yancey, Jr.

(57) ABSTRACT

Methods and devices for mitigating power consumption in CDMA slotted mode are aspects of the present disclosure. A method for controlling an access terminal includes entering an awake state of a slotted idle mode, adjusting a reacquisition time for acquiring a pilot signal from a first cell in accordance with a pilot signal quality from the first cell recorded in a prior awake state, and acquiring the pilot signal. Other aspects, embodiments, and features are also claimed and described.

44 Claims, 6 Drawing Sheets

METHODS AND DEVICES FOR MITIGATING POWER CONSUMPTION IN SLOTTED MODE COMMUNICATION PROTOCOLS

CROSS-REFERENCE TO RELATED APPLICATIONS

This application claims priority to and the benefit of provisional patent application No. 61/658,373, titled "Methods and Devices for Mitigating Power Consumption for Paging Channel Receive Attempts in CDMA 1x Idle Mode" and filed in the United States Patent Office on Jun. 11, 2012, the entire content of which is incorporated herein by reference as if fully set forth below in its entirety and for all applicable purposes.

TECHNICAL FIELD

The technology discussed in this patent application relates generally to wireless communications, and more specifically to methods and devices for mitigating power consumption in slotted mode communication protocols. Some embodiments can be utilized in CDMA slotted mode.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

To provide mobility, access terminals are typically mobile devices (e.g., smartphones, voice/data enabled mobile devices, etc.) However, such mobile access terminals are typically battery-powered, and the amount of power a battery can provide between charges is generally limited. Features which may assist in extending the battery-powered operating life of the access terminal between recharging are therefore beneficial.

SUMMARY OF SOME SAMPLE EMBODIMENTS

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various features and aspects of the present disclosure are adapted to facilitate power conservation when reacquiring a channel, such as communication protocols supporting a slotted idle mode. For example, reacquisition time may be increased when both a pilot signal quality recorded during a previous (or last) wake-up cycle was below a certain threshold and if the mobile station is going to attempt to receive a page message on the paging channel during the current wake-up cycle.

According to one aspect of the disclosure, a method for controlling power consumption of an access terminal in a wireless network is provided. The method includes entering an awake state of a slotted idle mode, adjusting a reacquisition time for acquiring a pilot signal from a first cell responsive to a determination of a signal characteristic of the pilot signal from the first cell in a prior awake state, and acquiring the pilot signal or some combination thereof.

According to another aspect of the disclosure, an access terminal configured for operation in a wireless network is provided. The access terminal includes a communications interface; a storage medium; and a processing circuit operatively coupled to the communications interface and the storage medium. The processing circuit is configured to enter an awake state of a slotted idle mode, adjust a reacquisition time for acquiring a pilot signal from a first cell responsive to a determination of a signal characteristic of the pilot signal from the first cell in a prior awake state, and operate the communications interface to acquire the pilot signal.

According to another aspect of the disclosure, a computer program product is provided. The computer program product includes a computer readable storage medium including instructions. The instructions cause an access terminal of a wireless network to enter an awake state of a slotted idle mode, adjust a reacquisition time for acquiring a pilot signal from a first cell responsive to a determination of a signal characteristic of the pilot signal from the first cell in a prior awake state, and acquire the pilot signal.

According to another aspect of the disclosure, an access terminal of a wireless network is provided. The access terminal includes means for entering an awake state of a slotted idle mode, means for adjusting a reacquisition time for acquiring a pilot signal from a first cell responsive to a determination of a signal characteristic of the pilot signal from the first cell in a prior awake state, and means for acquiring the pilot signal.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below for CDMA and 3rd Generation Partnership Project 2 (3GPP2) 1x protocols and systems, and related terminology may be found in much of the following description. However, those of ordinary skill in the art will recognize that one or more aspects of the present disclosure may be employed and included in one or more other wireless communication protocols and systems.

Figure 1:
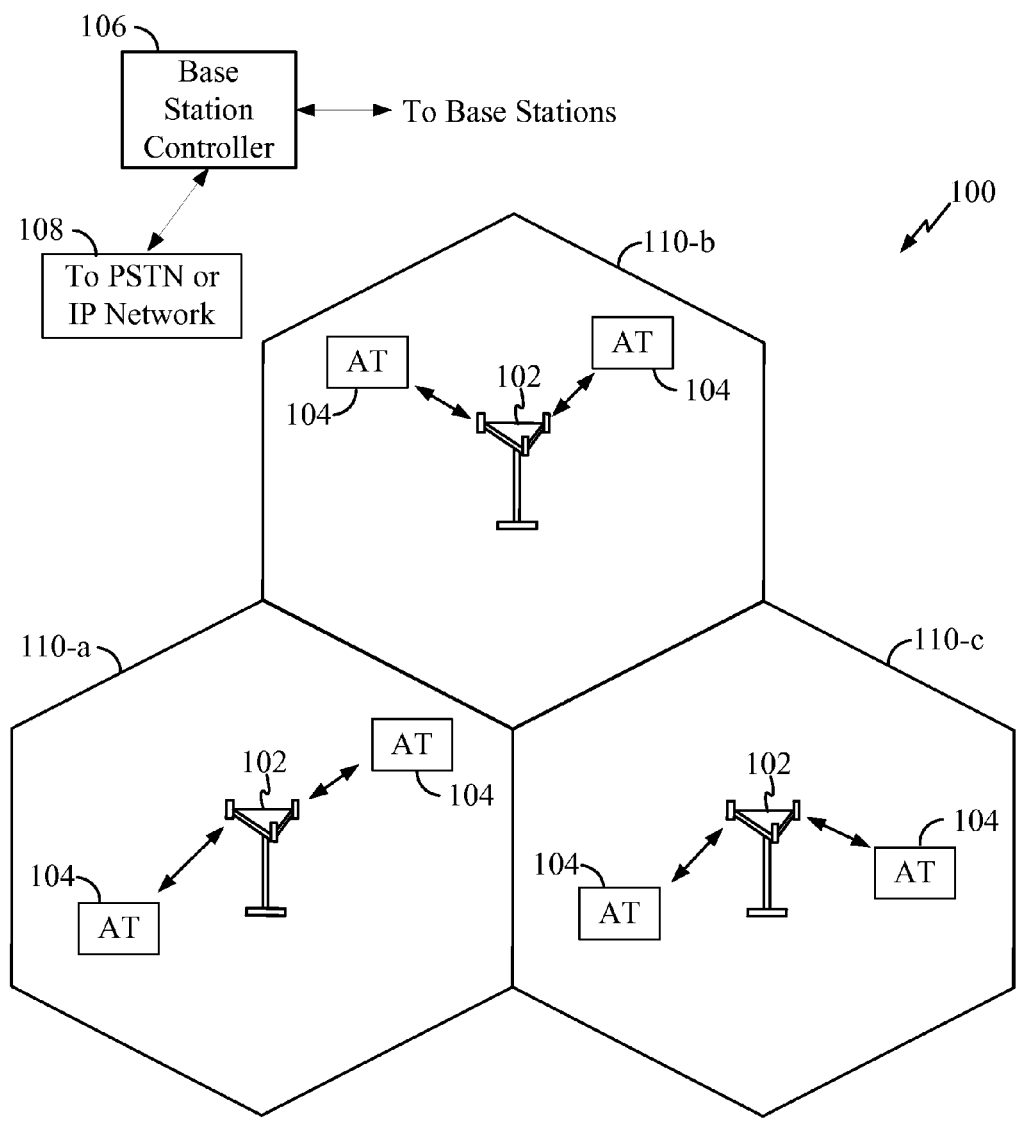
FIG. 1 is a block diagram illustrating an example of a network environment in which one or more aspects of the present disclosure may find application according to some embodiments.

FIG. 1 is a block diagram illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously or concurrently on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are generally configured to communicate with the access terminals 104 under the control of the base station controller 106 via one or more carriers. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

One or more access terminals 104 may be dispersed throughout the coverage areas 110, and may wirelessly communicate with one or more sectors associated with each respective base station 102. An access terminal 104 may generally include one or more devices that communicate with one or more other devices through wireless signals. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. The access terminals 104 may include mobile terminals and/or at least substantially fixed terminals. Examples of access terminals 104 include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, entertainment devices, and/or other communication/computing devices which communicate, at least partially, through a wireless or cellular network.

Figure 2:
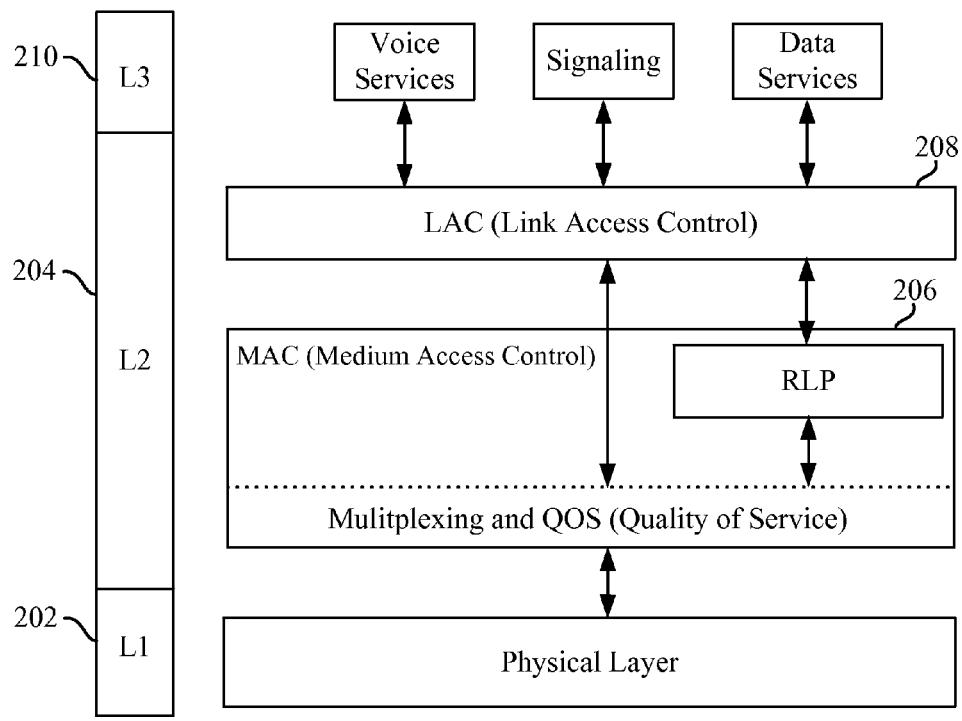
FIG. 2 is a block diagram illustrating an example of a protocol stack architecture which may be implemented by an access terminal according to some embodiments.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202.

The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) messages are also passed through the L3 layer 210.

As an access terminal 104 operates within the system 100, the access terminal 104 may operate in any of various states of operation, including an idle state and a system access state. In the system access state, the access terminal 104 may actively exchange data (e.g., voice or data calls or sessions) with one or more base stations (e.g., base stations 102 in FIG. 1). In the idle state, the access terminal 104 may monitor control channels, including but not limited to one or more of a common control channel (F-CCCH) and a broadcast control channel (F-BCCH) for carrying signaling data, a paging channel (F-PCH) for carrying system and overhead data such as paging messages, and/or a quick paging channel (F-QPCH) for letting the access terminal 104 know whether or not to receive the F-CCCH or the F-PCH in the next slot. The paging messages carried on the F-PCH (referred to herein as the PCH for brevity) may include messages that alert the access terminal 104 to the occurrence of an incoming voice or data call and control/overhead messages that carry system information and other information for the access terminal 104.

When operating in the idle state, depending on the particular technology utilized, the access terminal 104 may operate in a slotted mode or a non-slotted mode. In the non-slotted mode, the access terminal 104 generally monitors the paging channel at all times; on the other hand, in slotted mode, paging messages may be sent on the paging channel to the access terminal 104 at designated time intervals. Thus, instead of monitoring the paging channel continuously, the access terminal 104 can conserve power by periodically monitoring the paging channel in the slotted mode, which may also be referred to by those of skill in the art as discontinuous reception mode or DRX mode. In the slotted idle mode, the access terminal 104 wakes up from a "sleep" state at known time intervals, enters an "awake" state and processes one or more channels such as the quick paging channel and/or the paging channel for messages. If additional communication is not required, the access terminal 104 can revert back to the sleep state until the next designated time. For example, the access terminal 104 may wake up and reacquire the system by acquiring the pilot channel and the sync channel from the cell in order to obtain system timing information of a base station.

According to various aspects of the disclosure, the access terminal 104 may operate in the IS-95 mode or IS-2000 mode. However, the present disclosure is not limited thereto. In IS-95 slotted mode, the base station waits for the right slot to send a mobile-specific page on the paging channel. The access terminal 104 has to wake up to monitor the entire 80-ms slot because the access terminal 104 does not have knowledge on whether or not a page will arrive during its assigned slot. Therefore, in the related art, the access terminal may waste a significant amount of battery power to monitor the entire slot.

In IS-2000 slotted mode, the quick paging channel (F-QPCH) is introduced to address the above-described weakness of the IS-95 slotted mode. While the F-QPCH still lasts 80 ms, the access terminal 104 monitors only its designated paging indicator bits, which are shorter than 80 ms, in the quick paging channel slot. The exact position of a paging indicator is determined by a hash algorithm. The access terminal 104 wakes up and monitors the paging channel slot when the paging indicators indicate that there is a message coming in for the access terminal.

Figure 3:
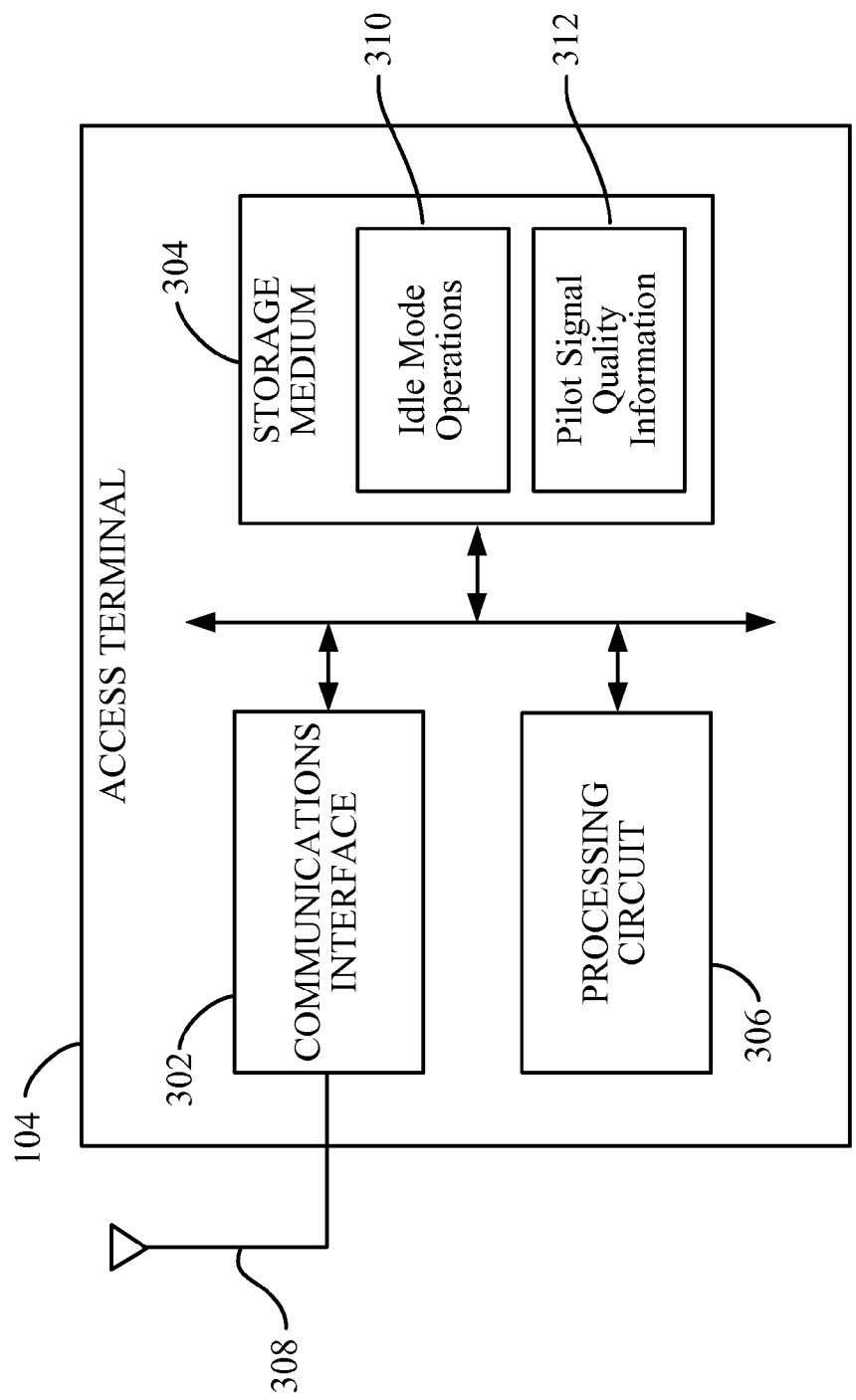
FIG. 3 is a block diagram illustrating select components of an access terminal according to at least one example according to some embodiments.

FIG. 3 shows a block diagram illustrating select components of an access terminal 104 according to at least one example of the present disclosure. The access terminal 104 includes a communications interface 302 and a storage medium 304. These components can be coupled to and/or placed in electrical communication with a processing circuit 306.

The communications interface 302 may be adapted to facilitate wireless communications of the access terminal 104. For example, the communications interface 302 may include circuitry and/or programming adapted to facilitate the communication of information bi-directionally with respect to one or more communications devices in a network. The communications interface 302 may be coupled to one or more antennas 308 for wireless communications within a wireless communications system. The communications interface 302 can be configured with one or more standalone receivers and/or transmitters, as well as one or more transceivers. In some aspects of the disclosure, the receivers may include one or more rake receivers configured to receive multipath signals.

Figure 4:
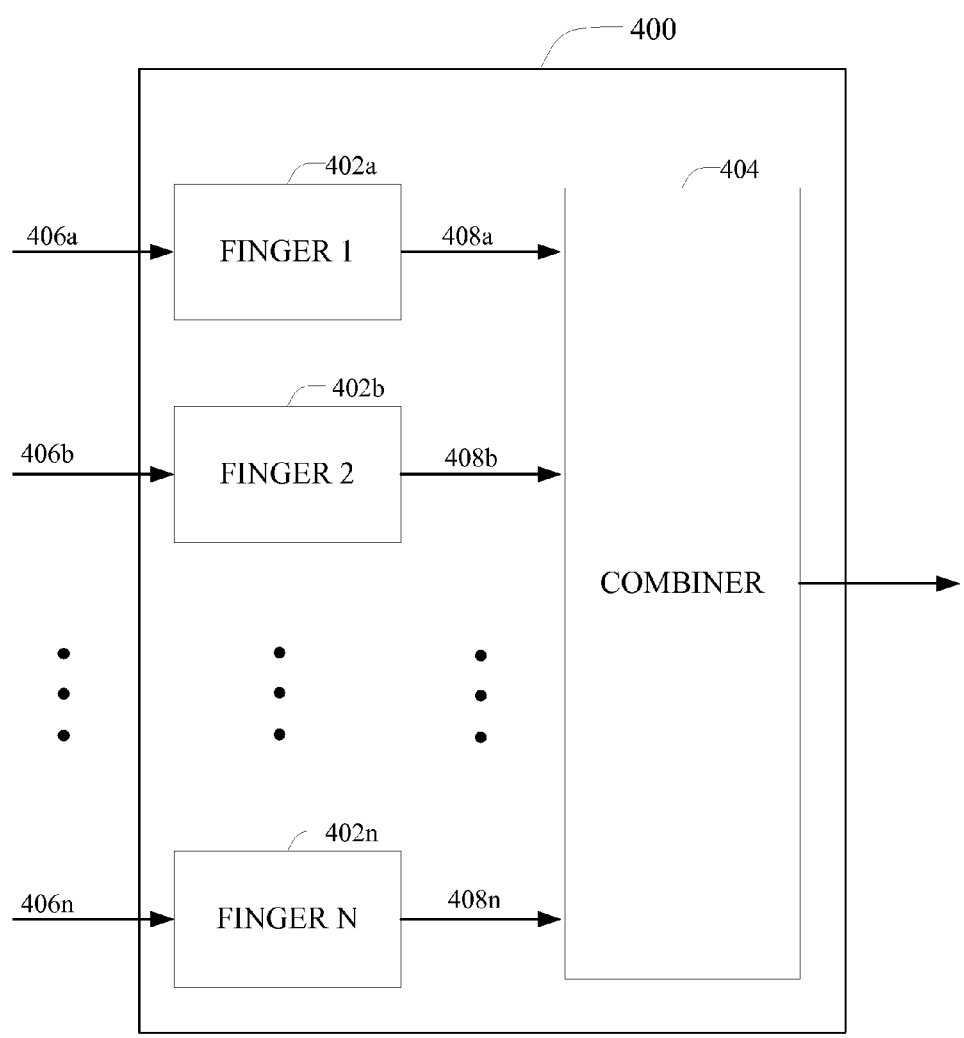
FIG. 4 is a block diagram illustrating a rake receiver according to one example according to some embodiments.

In CDMA communications, due to multipath propagation (and possibly multiple receive antennas), multiple correlation receivers may be used to recover the energy from all paths and/or antennas. Such a collection of correlation receivers, termed "fingers," is conventionally referred to as the rake receiver. FIG. 4 is a block diagram illustrating a rake receiver 400 as a non-limiting example that may be included in the access terminal 104, e.g., at the communications interface 302. The rake receiver 400 includes a number of fingers (402a, 402b . . . 402n) and a combiner 404. Each of the fingers may be configured to receive and demodulate one of the multiple path components (406a, 406b . . . 406n) of a pilot signal. The demodulated signals (408a, 408b . . . 408n) are provided to the combiner 404 that combines the signals to improve signal quality.

The storage medium 304 may represent one or more computer-readable, machine-readable, and/or processor-readable devices for storing programming, such as processor executable code or instructions (e.g., software, firmware), electronic data, databases, or other digital information. The storage medium 304 may also be used for storing data that is manipulated by the processing circuit 306 when executing programming The storage medium 304 may be any available media that can be accessed by a general purpose or special purpose processor, including portable or fixed storage devices, optical storage devices, and various other mediums capable of storing, containing or carrying programming By way of example and not limitation, the storage medium 304 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 304 may be coupled to the processing circuit 306 such that the processing circuit 306 can read information from, and write information to, the storage medium 304. That is, the storage medium 304 can be coupled to the processing circuit 306 so that the storage medium 304 is at least accessible by the processing circuit 306, including examples where at least one storage medium is integral to the processing circuit 306 and/or examples where at least one storage medium is separate from the processing circuit 306 (e.g., resident in the access terminal 104, external to the access terminal 104, distributed across multiple entities).

Programming stored by the storage medium 304, when executed by the processing circuit 306, causes the processing circuit 306 to perform one or more of the various functions and/or process steps described herein. For example, the storage medium 304 may include idle mode operations 310 adapted for regulating operations at one or more hardware blocks of the processing circuit 306, regulating power to one or more hardware blocks of the processing circuit 306, and/or regulating a sequence of operations when in idle mode, as described in further detail below. The idle mode operations may include programming implemented at any suitable layer of the protocol stack architecture depicted in FIG. 2.

The processing circuit 306 is generally adapted for processing, including the execution of such programming stored on the storage medium 304. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 306 is arranged to obtain, process and/or send data, control data access and storage, issue commands, and control other desired operations. The processing circuit 306 may include circuitry configured to implement desired programming provided by appropriate media in at least one example. For example, the processing circuit 306 may be implemented as one or more processors, one or more controllers, and/or other structure configured to execute executable programming. Examples of the processing circuit 306 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 306 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 306 are for illustration and other suitable configurations within the scope of the present disclosure are also contemplated.

According to one or more aspects of the present disclosure, the processing circuit 306 may be adapted to perform any or all of the features, processes, functions, steps and/or routines for any or all of the access terminals 104 described herein. As used herein, the term "adapted" or "configured" in relation to the processing circuit 306 may refer to the processing circuit 306 being one or more of configured, employed, implemented, and/or programmed to perform a particular process, function, step and/or routine according to various features described herein.

A slotted mode may include various different procedures and protocols according to various implementation details. In the slotted mode, the access terminal 104 monitors only the subset of time slots that are assigned to it. A non-limiting example of a slotted mode acquisition procedure is illustrated in FIG. 4. Here, as the access terminal 104 operates in slotted idle mode, one or more general page messages (GPMs) may be received by the access terminal 104 during each slot while the access terminal 104 is in an awake state.

Figure 5:
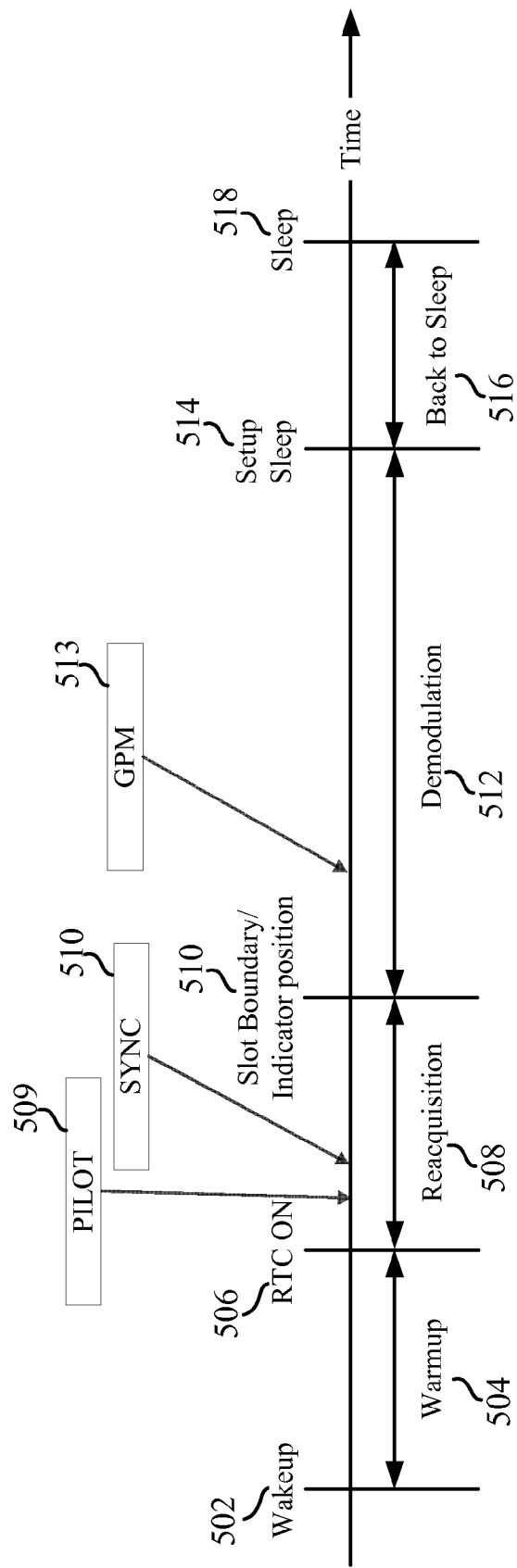
FIG. 5 is a timing diagram illustrating at least one example of some operations performed by an access terminal when monitoring a paging channel (PCH) in slotted idle mode according to some embodiments.

FIG. 5 shows a timing diagram depicting at least one example of some of the operations performed by an access terminal 104 when operating in the slotted idle mode. At a time prior to the expected time interval when the access terminal 104 is expected to be monitoring and processing transmissions, the access terminal 104 wakes up at 502 and begins warming up one or more receiver components at 504 (e.g., one or more receiver components of the communications interface 302 and/or one or more hardware blocks of the processing circuit 306). After the warm-up period 504, the receiver can be powered ON at 506, and the access terminal 104 may perform a reacquisition of the base station at 508. This reacquisition 508 may include a time period for acquiring a pilot channel 509 in which the pilot signal is transmitted, to determine factors such as timing synchronization, and which multipath pilot signal is the strongest. The reacquisition 508 may further include a time period for acquiring a sync channel 510 for providing time and frame synchronization. In this example, the results from the reacquisition 508 can be employed for processing transmissions received during the slot period.

At 510, the beginning of the slot may be identified by an indicator at the slot boundary, and the access terminal 104 receives and demodulates 512 any received transmissions (e.g., any received general page messages (GPMs)) in one or more communication channels. (e.g., paging channel). The demodulation 512 may include collection of samples for a single path of a multipath signal that was determined to be the strongest path in the reacquisition 508. Symbols are extracted from the collected samples, to process the symbols and obtain a general page message (GPM) 513.

If a general page message (GPM) includes a page intended for the receiving access terminal 104, the access terminal 104 can further communicate with the base station 102 to complete any requested operations. Otherwise, the access terminal 104 demodulates all received general page messages (GPMs) until an empty general page message (GPM) is received. As noted above, the empty general page message (GPM) may serve as an indicator that the access terminal 104 can return to the sleep state of the slotted idle mode. Accordingly, at 514, the access terminal 104 can initiate sleep setup to begin putting the access terminal 104 back into the sleep state of the slotted idle mode 516. Finally, at 518, the access terminal 104 is returned to the sleep state and may remain in the sleep state until the next scheduled slot.

For cdma2000 1x, to improve paging channel demodulation performance the reacquisition time 508 for sleep wake up has been increased. However, increasing the reacquisition time increases power consumption. Therefore, there may be a desire to increase the reacquisition time only under certain conditions, such that power consumption of the access terminal 104 can be mitigated or reduced.

Thus, in accordance with an aspect of the disclosure, the reacquisition time 408 may be increased when a pilot signal quality (or other signal characteristics or metrics) of the pilot signal recorded during the last wake-up cycle was below a certain threshold. In a further aspect of the disclosure wherein the slotted mode utilizes a quick paging channel or similar paging indicator channel, the reacquisition time 508 may be increased only if the access terminal is going to attempt to receive a page message on the paging channel during the current wake-up cycle. In this disclosure, the pilot signal quality or signal characteristic corresponds, but not limited to, at least one or more of pilot power, total power, signal strengths at a plurality of fingers at a receiver, a number of the fingers assigned to receive the pilot signal, or a combination thereof, received at the access terminal 104.

Figure 6:
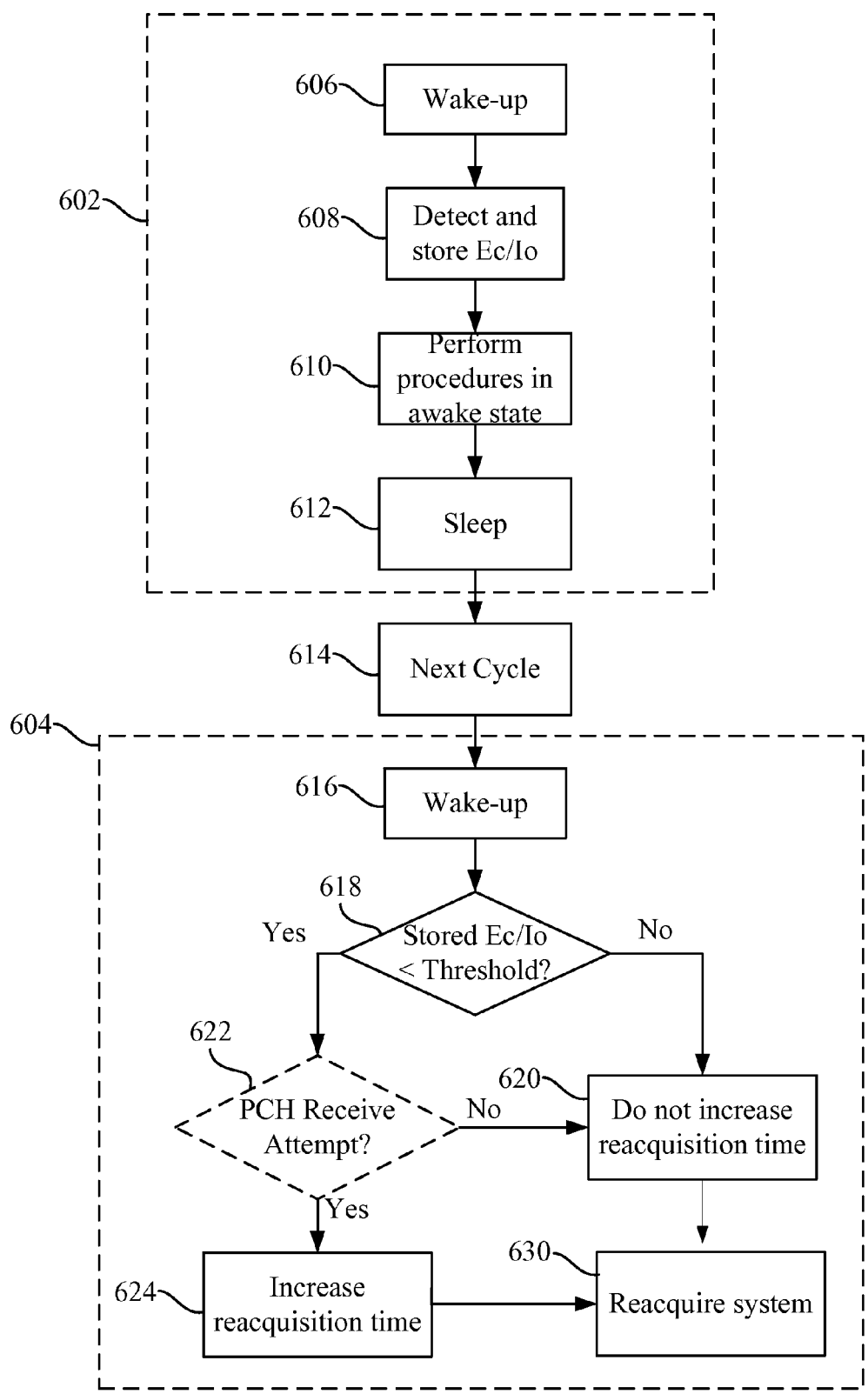
FIG. 6 is a flow chart illustrating a method operational on an access terminal according to at least one example according to some embodiments.

For example, FIG. 6 is a flow chart illustrating one example of a process for selectively increasing a reacquisition time 508 in accordance with some aspects of the disclosure. The illustrated procedure may be implemented at an access terminal 104, or at any suitable means for implementing the described functions. The illustrated process of FIG. 6 shows two consecutive wake-up cycles in a slotted mode. In the illustration, block 602 represents one wake-up cycle, and block 604 represents the next wake-up cycle.

At step 606, the access terminal may wake-up to begin a wake-up cycle, and at step 608, the access terminal may detect (or acquire) and store a value corresponding to a signal characteristic of a pilot signal in memory (e.g., as pilot signal quality information 312 stored in the storage medium 304). The stored value is an indication of the signal strength of the pilot signal. For example, the signal characteristic may be a ratio of pilot power to total power determined during the wake-up cycle 602. In one example, the signal characteristic may be an Ec/Io value as conventionally utilized in wireless communication systems for various purposes. However, the signal characteristic may be other suitable values that can indicate the signal quality of the pilot signal. In various examples, the Ec/Io value to be detected and stored at step 608 may be a value corresponding to a single finger at the rake receiver of the access terminal, or in some examples, the Ec/Io value to be detected and stored at step 608 may be a sum of values corresponding to a plurality of fingers at the rake receiver of the access terminal, e.g., all assigned fingers.

Still referring to FIG. 6, at step 610, the access terminal 104 may perform suitable procedures during the awake state of the access terminal 104. For example, the access terminal 104 may monitor for messages sent on the F-PCH, F-QPCH, F-CCCH, or F-BCCH. In addition, the access terminal 104 may also perform other functions such as originating a call, transmitting a user message, and performing a registration. At step 612, the access terminal 104 may return to sleep. For example, the processing circuit 306 (FIG. 3) may execute instructions from the storage medium 304 such that the access terminal 104 wakes up from a sleep mode or power-down state. At step 614, the access terminal may proceed to the next wake-up cycle, e.g., by waiting for a suitable sleep duration. During the step 610, the access terminal may access, for example, the quick paging channel to determine whether or not the access terminal 104 will attempt to receive a page message from the paging channel during the next slot (e.g., block 604).

At step 616, the access terminal 104 may wake-up to begin the second wake-up cycle 604. At step 618, the access terminal may determine whether the pilot signal quality recorded at step 608 (i.e., during the last wake-up cycle 602) was below a certain threshold. For example, the access terminal 104 may determine whether the stored value of Ec/Io was below a predetermined threshold, such as −12 dB or other suitable values. By utilizing this threshold value for the pilot signal quality, the reacquisition time will generally not be increased unless the access terminal 104 is in very low geometry or in time-dispersive channels, where performance can suffer with shorter reacquisition times. If the process at step 618 determines that the stored pilot signal quality is not less than the threshold, then the process may proceed to step 620 wherein the reacquisition time is not increased, e.g., a standard or conventional reacquisition time may be used.

On the other hand, if the Ec/Io value is less than the threshold, then the process may proceed to step 622, wherein the access terminal may determine whether it is going to attempt to decode the paging channel (PCH) during this wake-up cycle. That is, in some networks such as those that follow the IS-2000 standards, which utilize a quick paging channel (QPCH) or other similar paging indicator channel, the access terminal 104 may only attempt to decode the PCH during wake-up cycle 604 when it detects suitable information on the QPCH during the prior wake-up cycle 602; otherwise, the access terminal 104 knows that no page message directed to that access terminal would be included on that PCH. However, in some networks such as those that follow the IS-95 standards, which do not utilize the QPCH or other similar paging indicator channel, an access terminal 104 generally skips the preliminary step of detecting the QPCH and goes straight to the PCH during each wake-up cycle. In such a network, step 622 may not be utilized, and this condition may be assumed to be true.

Thus, if the access terminal 104 will attempt to receive the PCH during the current wake-up cycle 604, then the process may proceed to step 620, wherein the reacquisition time is not increased. On the other hand, if the access terminal 104 will attempt to receive the PCH in the current wake-up cycle 604, then the process may proceed to step 624, wherein the access terminal 104 may increase the reacquisition time. Subsequently, the process may proceed to step 630 to reacquire the system (e.g., acquire the pilot signal and other synchronization information). It is noted that the various steps, functions, or processes described in reference with FIG. 6 may be partially or fully implemented by programming (e.g., instructions and/or data) that may be stored in a machine-readable, computer-readable, and/or processor-readable storage medium (e.g., storage medium 304), and executed by one or more processors (e.g., processing circuit 306), machines and/or devices.

In various aspects of the disclosure, any suitable duration of increase in the reacquisition time may be utilized. In an example, the reacquisition time includes a pilot signal acquisition time, and the pilot signal acquisition time may be increased in step 624.

While the above discussed aspects, arrangements, and embodiments are discussed with specific details and particularity, one or more of the components, steps, features and/or functions illustrated in FIGS. 1-6 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 3, and/or 4 may be configured to perform or employ one or more of the methods, features, parameters, or steps described in FIGS. 5 and/or 6. The novel algorithms described herein may also be efficiently implemented in software and/or embedded in hardware, or a combination thereof.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A method for controlling power consumption of an access terminal in a wireless network, comprising:
    entering an awake state of a slotted idle mode;
    adjusting a reacquisition time for acquiring a pilot signal from a first cell responsive to a determination of a signal characteristic of the pilot signal from the first cell in a prior awake state, wherein the signal characteristic comprises an Ec/Io value determined during the prior awake state, where Ec is pilot power, and Io is total power; and
    acquiring the pilot signal.

2. The method of claim 1, wherein the adjusting the reacquisition time comprises increasing the reacquisition time in accordance with the signal characteristic determined in the prior awake state.

3. The method of claim 1,
    wherein the signal characteristic corresponds to at least one or more of pilot power, total power, signal strengths at a plurality of fingers at a receiver of the access terminal, a number of the fingers assigned to receive the pilot signal, or a combination thereof,
    wherein the adjusting the reacquisition time comprises increasing the reacquisition time if a value of the signal characteristic is below a predetermined threshold.

4. The method of claim 3, wherein the signal characteristic comprises a ratio of pilot power to total power corresponding to the first cell, determined during the prior awake state.

5. The method of claim 1, wherein the Ec/Io value is a value corresponding to at least one finger at the receiver of the access terminal.

6. The method of claim 1, wherein the Ec/Io value is a sum of values corresponding to the plurality of fingers at the receiver of the access terminal.

7. The method of claim 1, wherein the predetermined threshold is about −12 dB.

8. The method of claim 1,
    wherein the signal characteristic corresponds to a signal strength of the pilot signal, and
    wherein the adjusting the reacquisition time comprises increasing the reacquisition time if the signal strength is below a predetermined threshold, and if the access terminal is configured to receive a message on a communication channel during the current awake state according to an indication received from a base station in the prior awake state.

9. The method of claim 8, wherein the communication channel is a paging channel, and the message is a page message.

10. The method of claim 8, further comprising utilizing a quick paging channel during the prior awake state to determine whether or not the access terminal is configured to receive the message during the current awake state.

11. The method of claim 1,
    wherein the reacquisition time comprises a pilot channel acquisition time, and
    wherein the adjusting the reacquisition time comprises increasing the pilot channel acquisition time in accordance with the signal characteristic.

12. An access terminal configured for operation in a wireless network, comprising:
    a communications interface;
    a storage medium; and
    a processing circuit operatively coupled to the communications interface and the storage medium, wherein the processing circuit is configured to:
    enter an awake state of a slotted idle mode;
    adjust a reacquisition time for acquiring a pilot signal from a first cell responsive to a determination of a signal characteristic of the pilot signal from the first cell in a prior awake state, wherein the signal characteristic comprises an Ec/Io value determined during the prior awake state, where Ec is pilot power, and Io is total power; and
    operate the communications interface to acquire the pilot signal.

13. The access terminal of claim 12, wherein the processing circuit is configured to increase the reacquisition time in accordance with the signal characteristic determined in the prior awake state.

14. The access terminal of claim 12,
    wherein the signal characteristic corresponds to at least one or more of pilot power, total power, signal strength at a plurality of fingers at a receiver of the access terminal, a number of the fingers assigned to receive the pilot signal, or a combination thereof, and wherein the processing circuit is configured to increase the reacquisition time if the signal strength is below a predetermined threshold.

15. The access terminal of claim 14, wherein the signal characteristic comprises a ratio of pilot power to total power corresponding to the first cell, determined during the prior awake state.

16. The access terminal of claim 12, wherein the Ec/Io value is a value corresponding to at least one finger at a receiver included in the communications interface.

17. The access terminal of claim 12, wherein the Ec/Io value is a sum of values corresponding to a plurality of fingers at a receiver included in the communications interface.

18. The access terminal of claim 12, wherein the predetermined threshold is about −12 dB.

19. The access terminal of claim 12,
wherein the signal characteristic corresponds to a signal strength of the pilot signal, and
wherein the processing circuit is configured to increase the reacquisition time if the signal strength is below a predetermined threshold, and if the access terminal is configured to receive a message on a communication channel during the current awake state according to an indication received from a base station in the prior awake.

20. The access terminal of claim 19, wherein the communication channel is a paging channel, and the message is a page message.

21. The access terminal of claim 19, wherein the processing circuit is further configured to utilize a quick paging channel during the prior awake state to determine whether or not the access terminal is configured to receive the message during the current awake state.

22. The access terminal of claim 12,
wherein the reacquisition time comprises a pilot channel acquisition time, and
wherein the processing circuit is further configured to increase the pilot channel acquisition time in accordance with the signal characteristic.

23. A computer program product, comprising:
a computer readable storage medium comprising instructions for causing an access terminal configured for operation in a wireless network to:
enter an awake state of a slotted idle mode;
adjust a reacquisition time for acquiring a pilot signal from a first cell responsive to a determination of a signal characteristic of the pilot signal from the first cell in a prior awake state, wherein the signal characteristic comprises an Ec/Io value determined during the prior awake state, where Ec is pilot power, and Io is total power; and
acquire the pilot signal.

24. The computer program product of claim 23, wherein the access terminal is configured to increase the reacquisition time in accordance with the signal characteristic determined in the prior awake state.

25. The computer program product of claim 23,
wherein the signal characteristic corresponds to at least one or more of pilot power, total power, signal strengths at a plurality of fingers at a receiver of the access terminal, a number of the fingers assigned to receive the pilot signal, or a combination thereof, and
wherein the access terminal is configured to increase the reacquisition time if a value of the signal characteristic is below a predetermined threshold.

26. The computer program product of claim 25, wherein the signal characteristic comprises a ratio of pilot power to total power corresponding to the first cell, determined during the prior awake state.

27. The computer program product of claim 23, wherein the Ec/Io value is a value corresponding to at least one finger at a receiver of the access terminal.

28. The computer program product of claim 23, wherein the Ec/Io value is a sum of values corresponding to a plurality of fingers at a receiver of the access terminal.

29. The computer program product of claim 23, wherein the predetermined threshold is about −12 dB.

30. The computer program product of claim 23,
wherein the signal characteristic corresponds to a signal strength of the pilot signal, and
wherein the access terminal is configured to increase the reacquisition time if the signal strength is below a predetermined threshold, and if the access terminal is configured to receive a message on a communication channel during the current awake state according to an indication received from a base station in the prior awake state.

31. The computer program product of claim 30, wherein the communication channel is a paging channel, and the message is a page message.

32. The computer program product of claim 30, wherein the access terminal is further configured to utilize a quick paging channel during the prior awake state to determine whether or not the access terminal is configured to receive the message during the current awake state.

33. The computer program product of claim 23,
wherein the reacquisition time comprises a pilot channel acquisition time, and
wherein the access terminal is further configured to increase the pilot channel acquisition time in accordance with the signal characteristic.

34. An access terminal configured for operation in a wireless network, comprising:
means for entering an awake state of a slotted idle mode;
means for adjusting a reacquisition time for acquiring a pilot signal from a first cell responsive to a determination of a signal characteristic of the pilot signal from the first cell in a prior awake state, wherein the signal characteristic comprises an Ec/Io value determined during the prior awake state, where Ec is pilot power, and Io is total power; and
means for acquiring the pilot signal.

35. The access terminal of claim 34, wherein the adjusting the reacquisition time comprises increasing the reacquisition time in accordance with the signal characteristic.

36. The access terminal of claim 34,
wherein the signal characteristic corresponds to at least one or more of pilot power, total power, signal strengths at a plurality of fingers at a receiver of the access terminal, a number of the fingers assigned to receive the pilot signal, or a combination thereof, and
wherein the adjusting the reacquisition time comprises increasing the reacquisition time if a value of the signal characteristic is below a predetermined threshold.

37. The access terminal of claim 36, wherein the signal characteristic comprises a ratio of pilot power to total power corresponding to the first cell, determined during the prior awake state.

38. The access terminal of claim 34, wherein the Ec/Io value is a value corresponding to at least one finger at a receiver of the access terminal.

39. The access terminal claim 34, wherein the Ec/Io value is a sum of values corresponding to a plurality of fingers at a receiver of the access terminal.

40. The access terminal of claim 34, wherein the predetermined threshold is about −12 dB.

41. The access terminal of claim 34,
wherein the signal characteristic corresponds to a signal strength of the pilot signal, and
wherein the adjusting the reacquisition time comprises increasing the reacquisition time if the signal strength is below a predetermined threshold, and if the access terminal is configured to receive a message on a communication channel during the current awake state according to an indication received from a base station in the prior awake state.

42. The access terminal of claim 41, wherein the communication channel is a paging channel, and the message is a page message.

43. The access terminal of claim 41, further comprising means for utilizing a quick paging channel during the prior awake state to determine whether or not the access terminal is configured to receive the message during the current awake state.

44. The access terminal of claim 34,
wherein the reacquisition time comprises a pilot channel acquisition time, and
wherein the adjusting the reacquisition time comprises increasing the pilot channel acquisition time in accordance with the signal characteristic.

\* \* \* \* \*